Jan. 4, 1949.  G. LORY  2,458,009
SQUARE ROOT RADIAL AVERAGER

Filed March 13, 1944  2 Sheets-Sheet 1

Inventor
GEORGE LORY
By Hazard & Miller
Attorneys

Jan. 4, 1949.   G. LORY   2,458,009
SQUARE ROOT RADIAL AVERAGER
Filed March 13, 1944   2 Sheets-Sheet 2

Inventor
GEORGE LORY
By Hazard and Miller
Attorneys

Patented Jan. 4, 1949

2,458,009

UNITED STATES PATENT OFFICE 2,458,009

SQUARE ROOT RADIAL AVERAGER

George Lory, Los Angeles, Calif.

Application March 13, 1944, Serial No. 526,285

11 Claims. (Cl. 33—1)

This invention relates to a square root radial averager.

Many flow measuring devices record pressures or values indicative of the rate of flow on a circular chart which rotates at a predetermined speed, usually making one revolution per twenty-four hours. In determining the volume of flow that has passed through an orifice plate or other measuring device, the mean value or average of all of the instantaneous square root values as recorded on the chart must be determined.

Devices have heretofore been designed operating somewhat on the planimeter principle for making such determinations. One such device that has been successfully employed consists of a slotted base plate or cam that is equipped with a tracer stylus and with an integrator. The slot in the base plate or cam is applicable on a center that is applied to the center of the chart that is to be read. The slot is so curved or shaped that as the tracer stylus is caused to follow the record line, the integrator will register the average of the instantaneous square root of the values represented by the record line.

Several objections are present in such constructions that the present invention is designed to overcome. The circular charts used by various orifice meter manufacturers are not uniform. They differ from each other, (1) in the distance of the base circle from the center of the chart, (2) in the curvature of the ordinate lines extending outwardly towards the edge of the chart, and (3) the spacing of the circles that constitute the abscissae. Because of this variation of the different charts that are to be read, the square root radial averagers heretofore developed are only susceptible of being used with but a single style of chart, that is to say each square root radial averager can only be used with a chart having its base circle a specified distance from the center of the chart, the ordinates with the specified curvature and the abscissae with the specified spacing. If a chart was to be read that did not meet all of these requirements, then a separate square root radial averager of slightly different design had to be employed which had the slot in the base or guide plate so formed as to take care of the changed conditions. Thus if a plurality of different charts were to be read, as many square root radial averagers were necessary as there were different styles of charts. The present invention has for one of its objects the provision of a square root radial averager which is so design that the integrator is removably attached thereto so that a person or concern having occasion to read a plurality of different styles of charts need only acquire a single integrator and a plurality of base plates or guides on which the integrator may be detachably mounted. Thus by selecting a proper base plate or guide corresponding to any given chart, the integrator may be easily and quickly applied thereto and the chart read. When occasion required that another style of chart be read, the proper base plate or guide designed in conformity therewith may be selected and the integrator applied thereto. In this way with a relatively small supply of various base plates or guides the same integrator may be utilized to read a multiplicity of different styles of charts.

Another object of the invention is to provide an improved and simplified base plate or guide presenting a cam edge which is external of the plate. Heretofore when the cam surface was formed by a slot in the plate intermediate the side edges thereof, if the cam edge was inaccurate in shape or became worn, correction thereof was extremely difficult. By means of the present construction the cam edge is continuously but yieldably urged into engagement with the center providing means so as to be guided thereby and if the edge becomes inaccurate or worn, correction can be easily accomplished by merely grinding off the edge to an accurate shape.

A further object of the invention is to provide an improved square root radial averager wherein the base plate or guide carries a graduated swivel arm on which the integrator is removably and adjustably mounted. In this way the wheel or roller of the integrator can be allowed to rest against the face of the chart by gravity and regardless of the fact that the chart may not be uniformly smooth and may have small depressions and elevations, an accurate determination of the square root values can be read therefrom.

Still another object of the invention is to provide an improved tracer arm for use on square root radial averagers, planimeters and analagous constructions, wherein a tracer point is caused to follow a line on a chart or graph.

With the foregoing and other objects in view which will be made manifest from the following detailed description and specifically pointed out in the appended claims, reference is had to the accompanying drawings for an illustrative embodiment of the invention, wherein, Fig. 1 is a top plan view illustrating the square root radial averager embodying the present invention as applied to a circular chart on which has been drawn a record line, the average of the square root values of which it is desired to ascertain;

Figure 1:
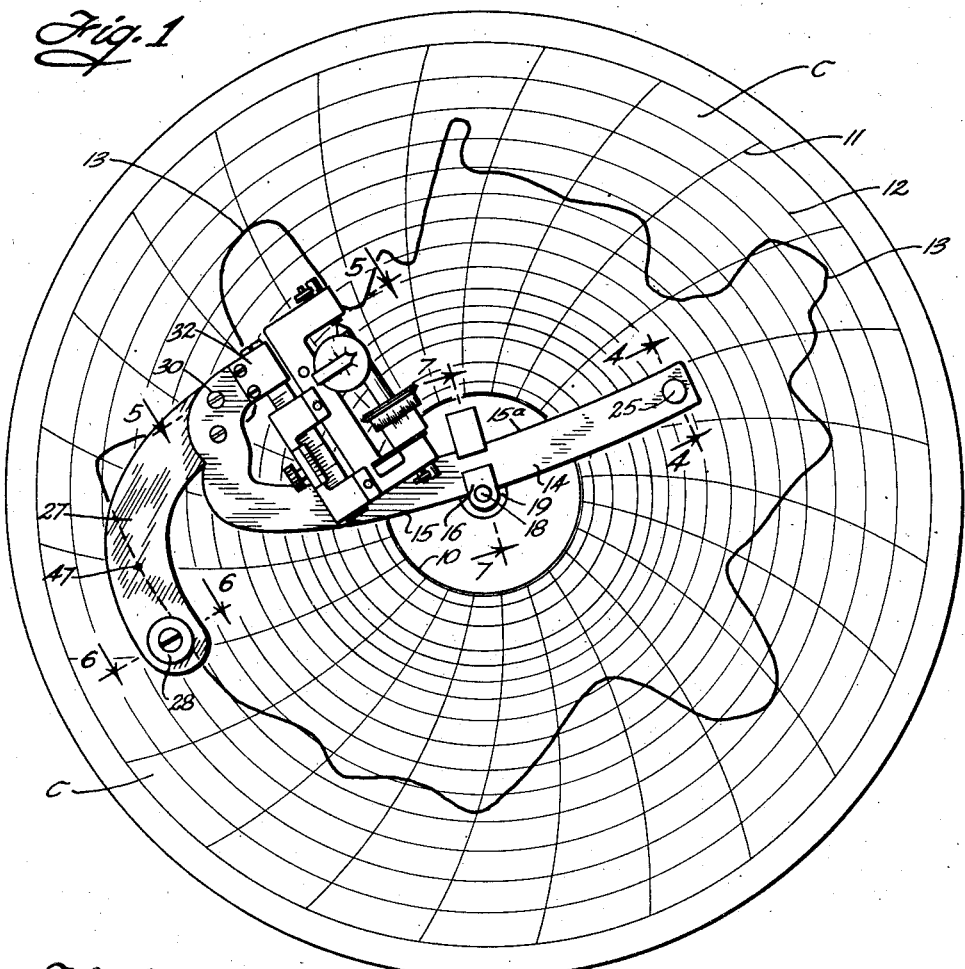
Figure 2:
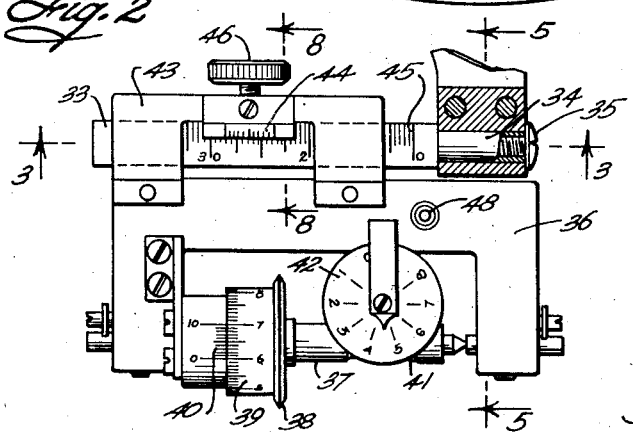
Fig. 2 is a top plan view of the integrator portion of the device shown in Fig. 1.
Figure 3:
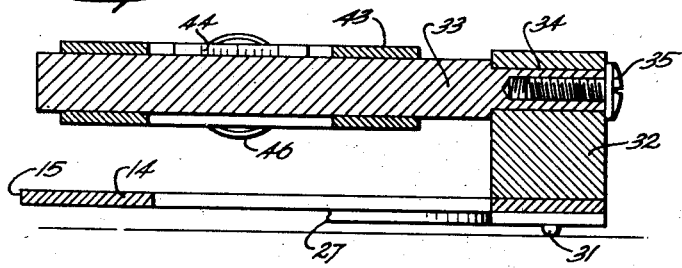
Fig. 3 is a vertical section taken substantially upon the line 3—3 upon Fig. 2 in the direction indicated.
Figure 4:
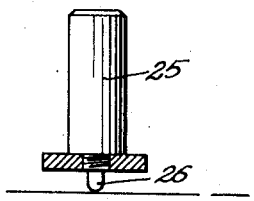
Fig. 4 is a sectional view taken substantially upon the line 4—4 upon Fig. 1 in the direction indicated.
Figure 5:
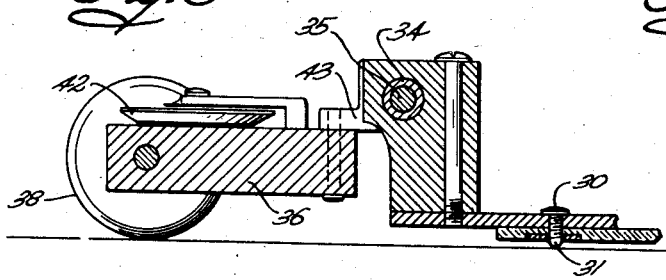
Fig. 5 is a vertical section taken substantially upon the line 5—5 on Fig. 2 in the direction indicated.
Figure 6:
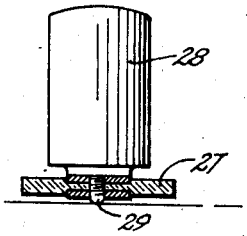
Fig. 6 is a sectional view taken upon the line 6—6 upon Fig. 1 in the direction indicated.
Figure 7:
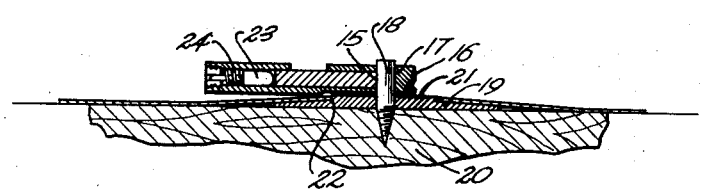
Fig. 7 is a section taken substantially upon the line 7—7 upon Fig. 1.
Figure 8:
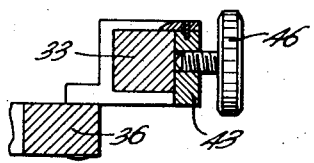
Fig. 8 is a section taken substantially upon the line 8—8 upon Fig. 2.

Referring to the accompanying drawings wherein similar reference characters designate similar parts throughout, the square root radial averager embodying the present invention is illustrated as applied to a circular chart C having an inner circle 10 representative of the base line or abscissa and having curved ordinates 11. These ordinates are traversed by additional circles 12.

Manufacturers of different orifice meters and like flow measuring equipment have different charts, although they are generally of the same character. The radial distance of the base line 10 from the center of the chart varies, the curvature of the ordinates 11 likewise varies and the spacing of the circles 12 from each other is another variable. In some charts these circles are uniformly spaced from each other. In a large percentage of charts the spacing gradually increases from the base circle 10 outwardly. The rate of increase of the spacing varies. On the chart I have illustrated a record line 13 which is drawn on the chart by a recording means and this record line bears a definite relation to the rate of flow as will be understood by those skilled in the art.

The square root radial averager embodying the present invention comprises a base plate or guide 14, presenting a curved or cam edge 15 so designed as to cause the integrator to accurately register the mean value or average of the square root values indicated on the chart by the record line 13. The curvature of the curve 15 varies with different styles of charts, being affected by the location of the base line 10, the curvature of the ordinates 11 and the spacing of the circles 12. Thus with each different type of chart the nature of the curvature of the edge 15 will vary. The major portion of the length of the base or guide plate 14 is of substantially uniform width so as to accommodate a slide 16. This slide has an aperture 17 adjacent one end thereof adapted to receive a screw or center pin 18 adapted to be driven through a relatively thin washer 19 into a drawing board 20 or other suitable support on which the chart may be mounted. The washer 19 has a central boss 21 that fits the aperture 22 which is conventionally formed in the chart at the center thereof. The slide is so designed that the edge 15 may slide upon and bear against the side of the center pin 18. It is urged into engagement with the center pin by means of a small spring actuated plunger 23 actuated by a compression spring 24. In this manner the edge 15 is continually but yieldably urged against the side of the center pin which extends through the center of the chart when the chart is positioned on the washer 19. The slide is freely turnable about the pin 18 as a center.

At one end of the base plate or guide 14 there is a small upstanding knob or handle 25 which is screwed into the base plate and which has a downwardly projecting knob 26 engageable with the chart so as to support this end of the base or guide plate above the chart. Adjacent the opposite end of the base or guide plate 14 there is secured a tracer arm 27 equipped with a handle 28 and which likewise is provided with a small downwardly extending knob 29 engageable with the chart C. Preferably one or more of the screws 30 that fasten the tracer arm to the base or guide plate projects sufficiently to provide a knob 31 engageable with the chart. In this manner the base or guide plate 14 is supported at three points over the chart independently of the slide 16. Near the point where the tracer arm 27 is fastened to the base or guide plate, there is secured an upstanding standard 32 which serves as a standard for a graduated horizontally extending swivel arm. This swivel arm indicated at 33 is squared throughout the major portion of its length but adjacent one end it is turned down into a cylinder 34 and this cylinder is drilled and tapped to accommodate a screw 35 which maintains the swivel arm on the standard but which enables it to rotate about a horizontal axis relatively thereto. This swivel arm is designed to removably receive an integrator which conforms generally to the analogous structure used on planimeters. It consists of a U-shaped yoke 36 the arms of which provide or have mounted thereon, bearings for the ends of a spindle 37. On the spindle there is a wheel or roller 38 adjacent which there are graduations 39. A vernier scale 40 is arranged in close proximity to the graduations 39 to facilitate the taking of the fine reading thereon. The spindle has a thread or worm 41 which on rotation of the spindle operates or turns a counter wheel 42. A bracket 43 is secured to the back of the yoke and is so formed as to be receivable over the swivel arm 33. This bracket carries a tightening screw 46 by which the bracket of the integrator may be held firmly in adjusted position.

A feature of the present construction resides in the construction of the tracer arm and its tracer point. The tracer arm is formed of a relatively thin section of transparent material such as transparent plastic. In this tracer arm there is drilled a very small or fine hole 47 which is filled with a contrasting pigment of any suitable character. The hole is so located on the tracer arm as to be in the plane of the wheel or roller 39. By means of this construction the tracer point formed by the filled hole can be caused to accurately follow the record line 13, inasmuch as the operator on looking down on the instrument can simultaneously see all around the tracer point and its relationship to the record line. Such a construction is a decided improvement over a stylus point, in that such points are usually fairly heavy and when observed from an angle, by reason of their opaque nature they conceal that portion of the chart and record line that is behind the stylus.

The operation of the improved square root radial averager is as follows: The wheel 39 may be spun until its initial reading is zero; then a starting point on the record line 13 is noted and the tracer point 47 is caused to follow the record line. The record line is completely traced about the entire chart in a clockwise direction back to the noted starting point and the reading of the integrator then noted. From this reading which is representative of the mean value of the square root, of the values represented by the record line, the flow can be computed in a manner well understood by those skilled in the art.

In the event that one person or concern has a number of different styles of charts to read in this manner, wherein the location of the base circle 10 varies, the curvature of the ordinates 11 or the spacing of the circles 12 varies, it is not necessary that he be supplied with a corresponding number of different square root radial averagers. It is merely necessary that he acquire one integrator and a sufficient number of bases or guide plates 14 with their attached tracer arms and swivel arms to correspond to the various types of charts. In other words, if there are to be read six different styles of charts, six different guide plates or bases 14 with their attached tracer arms and swivel arms are necessary, but only one integrator. These bases or guide plates will differ from each other only in the curvature in the edge 15 and possibly in the location of the tracer point 47. When it is desired to read any particular chart, its guide plate and tracer arm are selected and the integrator applied thereto. With each guide plate or base, the reading on the graduations 45 on the swivel arm is given or supplied by the manufacturer so that the integrator may be properly positioned along the length thereof. This is determined by a proper adjusting of the vernier 44 with reference to the graduations 45.

As the tracer point 47 is caused to move inwardly and outwardly over the face of the chart in following the record line 13, the base or guide plate 14 merely slides through the slide 16 and is continually urged into engagement with the center pin 18. In the course of time edge 15 may become worn so that it is no longer accurate and in this event correction can be easily accomplished by merely grinding off a portion of the guide plate so as to establish a new and correct properly curved edge 15 corresponding to the chart with which it is to be used. In this manner correction of the instrument is very easily accomplished, it being understood that when a portion of the edge is grounded to correct the same, that the spring actuated plunger 23 will thereafter cause the newly ground edge to be pressed against the center pin in the same manner as originally.

In some instances, persons or concerns having occasion to read circular charts of this general type may only have two different types of charts that they desire to read. In such event it frequently occurs that the two different styles of charts are sufficiently close together that the difference in the curve or cam edge on the base plate is not very great. Consequently it is possible to have a single base plate provided with two curves one being the curved edge 15 and the other being the opposite curved edge 15a. When reading one style of chart the base plate 14 may be extended through the slide 16 so that edge 15 will bear and slide against the center pin 18. Then when occasion requires that the other style of chart be read, knob 25 can be removed, the base plate 14 removed from the slide 16 and the parts reassembled so that the edge 15a is caused to slide against the center pin 18. The small differences between the two curves are compensated for by the spring actuated plunger 23 merely sliding back and forth in maintaining whichever edge 15 or 15a is against the center pin 18 in contact therewith.

In some instances charts have their base line or zero circle located approximately one half the distance between the inner and outer edges of the charts. The use of a base plate 14 with two cam edges 15 and 15a can be advantageously employed with such charts. Thus one edge 15 may be caused to bear against the center pin 18 to measure the square roots of values recorded outwardly of the base line or zero circle. Then by reassembling the base plate and slide 16 the other edge 15a may be caused to bear against the center pin 18 to determine values recorded inwardly of the base line or zero circle.

By means of the above described construction it will be appreciated that where a number of different styles of charts are to be read that only a single integrator need be employed. It may be attached to and detached from any required number of base plates or guides by merely slipping it on and off of the swivel arms thereof. In some instances it may be desirable to use the same integrator on the arms of a polar planimeter. To do this the yoke at 36 is preferably provided with a hemispherical socket 48 adapted to receive the pole arm of a polar planimeter. When so used the tracer arm of the planimeter is positioned in the bracket 43 in place of the swivel arm.

It will be noted that during the operation of the devices that the integrator is at all times free to swing downwardly about the swivel arm as a center so that the periphery of the wheel or roller 39 engages the chart with force equal to the weight of the integrator. Consequently even though the chart may be rough or uneven the integrator may rise and fall as required to accurately follow the chart under the influence of the tracer point tracing the record line 13.

Various changes may be made in the details of construction without departing from the spirit or scope of the invention as defined by the appended claims.

1. A square root radial averager comprising a guide plate, a tracer point thereon, an arm on the guide plate, and an integrator having a wheel mounted on the arm, said integrator being adjustable along the length of the arm to position the plane of the wheel in alignment with the tracer point, said arm being mounted for rotation upon the guide plate to permit the integrator to swing relatively to the guide plate into engagement with a chart being traced by the tracer point.

2. A square root radial averager having a guide plate presenting an edge designed to be adjusted relatively to a center, an integrator and tracer point on the guide plate, and means for causing the edge to be yieldably but continually urged against the center.

3. A square root radial averager having means providing a center, a guide plate presenting an external edge adapted to traverse the center, an integrator and tracer point on the guide plate, and spring means continually urging said edge into engagement with the center providing means.

4. A square root radial averager comprising a guide plate presenting an external edge by which it may be guided relatively to a center providing means, means for yieldably holding said edge against the center providing means, means providing a tracer point on the guide plate, an arm on the guide plate and an integrator removably mounted upon said arm.

5. A square root radial averager comprising a guide plate presenting an edge by which it may be guided, a center providing means, a slide on the guide plate, spring actuated means on the slide for urging the guide plate into engagement with the center providing means, means whereby the slide may be attached to the center providing means for rotation relatively thereto, a tracer point on the guide plate, a graduated swivel arm on the guide plate, and an integrator removably and adjustably mounted on the graduated swivel arm.

6. A device of the class described comprising means providing a center, a guide plate movable relatively to the center, spring means urging an edge of the guide plate into engagement with the center as it moves relatively thereto, means providing a tracer point on the guide plate, and an integrator mounted on the guide plate.

7. A device of the class described comprising means providing a center, a guide plate presenting an external edge movable relatively to the center, spring means urging said external edge of the guide plate into engagement with the center as it moves relatively thereto, means providing a tracer point on the guide plate, and an integrator mounted on the guide plate.

8. A device of the class described comprising a guide plate movable relatively to a center, means providing a tracer point on the guide plate, an arm mounted for rotation on the guide plate adapted to rotate about an axis parallel to the plane of the guide plate, and an integrator removably mounted upon said arm whereby the integrator may swing on the arm into engagement with a chart traversed by the tracer point.

9. A device of the class described comprising a guide plate movable relatively to a center, means providing a tracer point on the guide plate, an arm mounted for rotation on the guide plate adapted to rotate about an axis parallel to the plane of the guide plate, and an integrator removably and adjustably mounted along the length of the arm.

10. A device of the class described comprising a guide plate movable relatively to a center, means providing a tracer point on the guide plate, an arm mounted for rotation on the guide plate adapted to rotate about an axis parallel to the plane of the guide plate, and an integrator removably and adjustably mounted along the length of the arm, said arm having a scale thereon relatively to which the integrator may be adjusted.

11. A device of the class described comprising means providing a center, a guide plate presenting approximately parallel external edges one of which is slidable relatively to the center, means engageable with the other side edge for holding the guide plate with the mentioned edge against the center, a tracer point on the guide plate, and an integrator on the guide plate.

GEORGE LORY.

REFERENCES CITED

The following references are of record in the file of this patent:

UNITED STATES PATENTS

| Number | Name | Date |
|---|---|---|
| 927,338 | Durand | July 6, 1906 |
| 1,058,148 | Buvinger | Apr. 8, 1913 |
| 1,314,463 | Bristol | Aug. 26, 1919 |
| 1,650,490 | Brown | Nov. 22, 1927 |
| 1,867,441 | Dall | July 12, 1932 |
| 1,886,576 | Ott et al. | Nov. 8, 1932 |
| 1,994,843 | Weishampel | Mar. 19, 1935 |

FOREIGN PATENTS

| Number | Country | Date |
|---|---|---|
| 653,354 | Germany | Nov. 20, 1937 |